(12) United States Patent
Brandt et al.

(10) Patent No.: US 7,065,926 B2
(45) Date of Patent: Jun. 27, 2006

(54) MANUFACTURED HOME FRAME

(75) Inventors: Thomas R. Brandt, Nappanee, IN (US); James F. Shea, Mishawaka, IN (US)

(73) Assignee: Fairmont Homes, Inc., Nappanee, IN (US)

( * ) Notice: Subject to any disclaimer, the term of this patent is extended or adjusted under 35 U.S.C. 154(b) by 0 days.

(21) Appl. No.: 10/336,586

(22) Filed: Jan. 3, 2003

(65) Prior Publication Data
US 2004/0128941 A1 Jul. 8, 2004

(51) Int. Cl.
E04B 1/34 (2006.01)

(52) U.S. Cl. ........................................ 52/143; 280/789

(58) Field of Classification Search .................. 52/143, 52/653.1, DIG. 11; 296/181, 182, 168, 204; 280/789, 799, 798, 781
See application file for complete search history.

(56) References Cited

U.S. PATENT DOCUMENTS

| | | | | |
|---|---|---|---|---|
| 2,048,579 A | * | 7/1936 | Webber | 296/186.1 |
| 3,623,744 A | * | 11/1971 | Bertness et al. | 280/785 |
| 3,697,098 A | * | 10/1972 | Fisher | 280/415.1 |
| 3,738,678 A | | 6/1973 | King et al. | 280/106 |
| 3,751,870 A | * | 8/1973 | Vesei | 52/656.1 |
| 3,806,147 A | | 4/1974 | Hanson | 280/30 |
| 3,831,338 A | | 8/1974 | Klingensmith et al. | 52/752 |
| 4,084,834 A | * | 4/1978 | Becker | 280/789 |
| 4,106,258 A | | 8/1978 | Lindsay | 52/693 |
| 4,111,451 A | * | 9/1978 | Pinto | 280/408 |
| 4,272,930 A | * | 6/1981 | Foster | 52/79.1 |
| 4,344,262 A | | 8/1982 | Berman et al. | 52/227 |
| 4,736,525 A | | 4/1988 | Deason | 33/474 |
| 4,863,189 A | * | 9/1989 | Lindsay | 280/789 |
| 4,906,021 A | * | 3/1990 | Rowe et al. | 280/789 |
| 5,028,072 A | | 7/1991 | Lindsay | 280/789 |
| 5,468,008 A | * | 11/1995 | Hecht | 280/638 |
| 5,553,989 A | * | 9/1996 | Ullman | 414/537 |
| 5,706,615 A | | 1/1998 | Bridges et al. | 52/105 |
| 5,992,121 A | * | 11/1999 | Lindsay | 52/690 |
| 6,018,921 A | * | 2/2000 | Lindsay | 52/690 |
| 6,035,590 A | * | 3/2000 | Lindsay | 52/143 |
| 6,343,830 B1 | * | 2/2002 | Ingram et al. | 296/168 |

OTHER PUBLICATIONS

Sheet showing five prior art floor truss cross sections, one sheet, date unknown.

* cited by examiner

Primary Examiner—Robert P. Olszewski
Assistant Examiner—A. Joseph Wujciak
(74) Attorney, Agent, or Firm—Barnes & Thornburg LLP

(57) ABSTRACT

A floor frame for a transportable manufactured home includes spaced apart perimeter frame members having a vertical wall and two horizontal walls extending therefrom. A plurality of floor joists extend between the spaced apart perimeter frame members and have notched ends configured to each receive a portion of one perimeter frame member. An arrangement for coupling a transport structure to the floor frame is also disclosed.

19 Claims, 7 Drawing Sheets

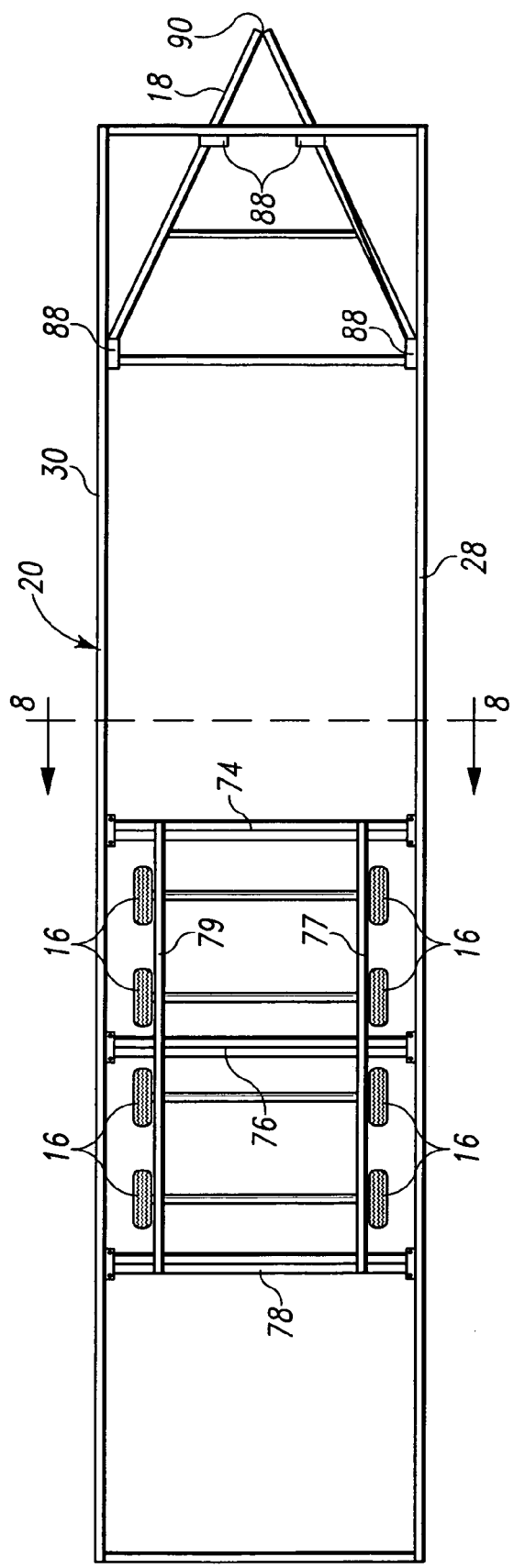
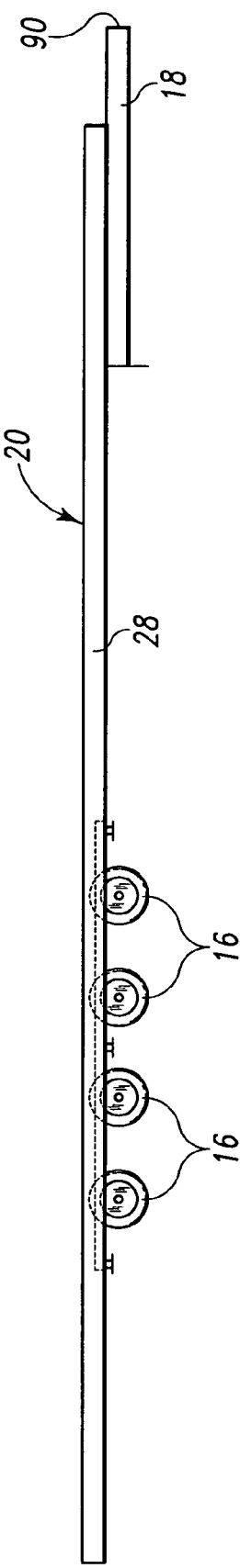
Fig. 6
Fig. 7

MANUFACTURED HOME FRAME

BACKGROUND OF THE INVENTION

The present invention relates to manufactured homes, and particularly to transportable manufactured homes. More particularly, the present invention relates to a frame for a transportable manufactured home.

Manufactured and modular homes are typically transported to their destination by pulling them behind a tow vehicle. A transport structure is customarily mounted below the manufactured or modular home in order to provide wheels for the home. Such a transport structure requires sufficient support from the floor frame of the home, and is typically not utilized once the home has arrived at its destination.

SUMMARY OF THE INVENTION

The present invention includes one or more of the following features or my combination thereof:

According to the disclosure, a manufactured or modular home includes a floor frame structure having a perimeter frame and a plurality of floor joists spanning between members of the perimeter frame. The perimeter frame may include a pair of spaced apart side frame members and a pair of end frame members interconnecting the side frame members. Each of the side frame members may have a C-shaped cross section defined by a vertical wall, a top wall extending from a top region of the vertical wall, and a bottom wall extending from a bottom region of the vertical wall. Each floor joist may have a pair of ends, and each end may be formed to include a notch. The floor joist notches may receive a portion of the top wall and a portion of the vertical wall of the associated side frame members.

A transport structure may be detachably coupled to the perimeter frame. The transport structure carries a plurality of wheels, and can be detached from the perimeter frame upon positioning the manufactured home at its destination. Additionally, a tow structure can be provided that is detachable from the perimeter frame upon delivery of the manufactured home.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 6 is a top plan view of the perimeter of the floor frame having the transport structure coupled thereto;

FIG. 7 is a side elevation view of the frame and transport structure of the floor frame in transport structure of FIG. 6;

DETAILED DESCRIPTION OF THE DRAWINGS

Figure 1:
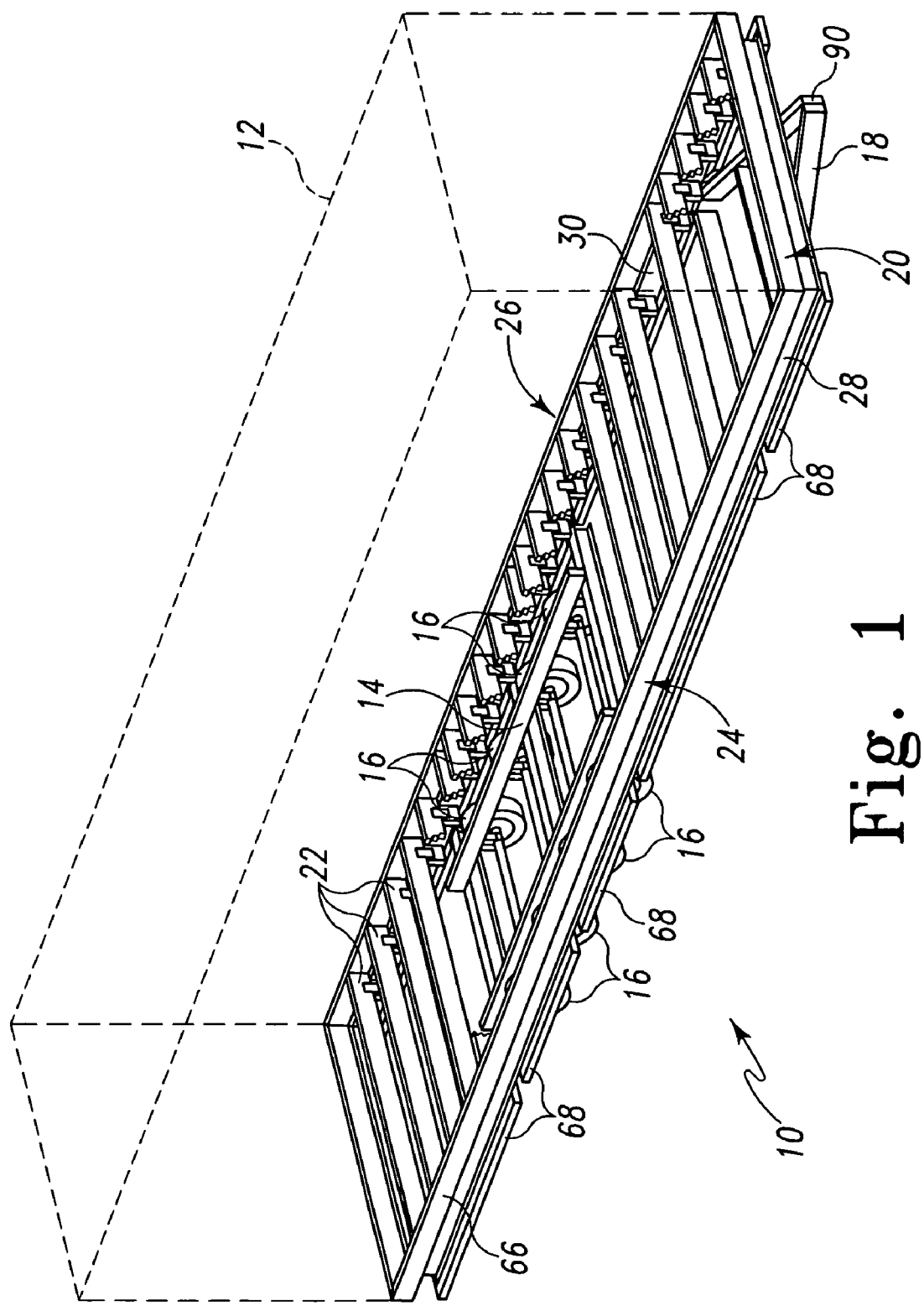
FIG. 1 is a perspective view of a floor frame structure for a manufactured home.

A floor frame 10 for a manufactured home 12 (shown illustratively in dashed lines) is shown in FIG. 1 equipped with a transport structure 14 having wheels 16 for supporting floor frame 10 for transportation on a road. Illustratively, floor frame 10 is rectangular in shape and includes a hitch rail or an apexed member 18 (visible in FIG. 9) for mounting floor frame 10 on a trailer hitch of a tow vehicle (not shown).

Figure 9:
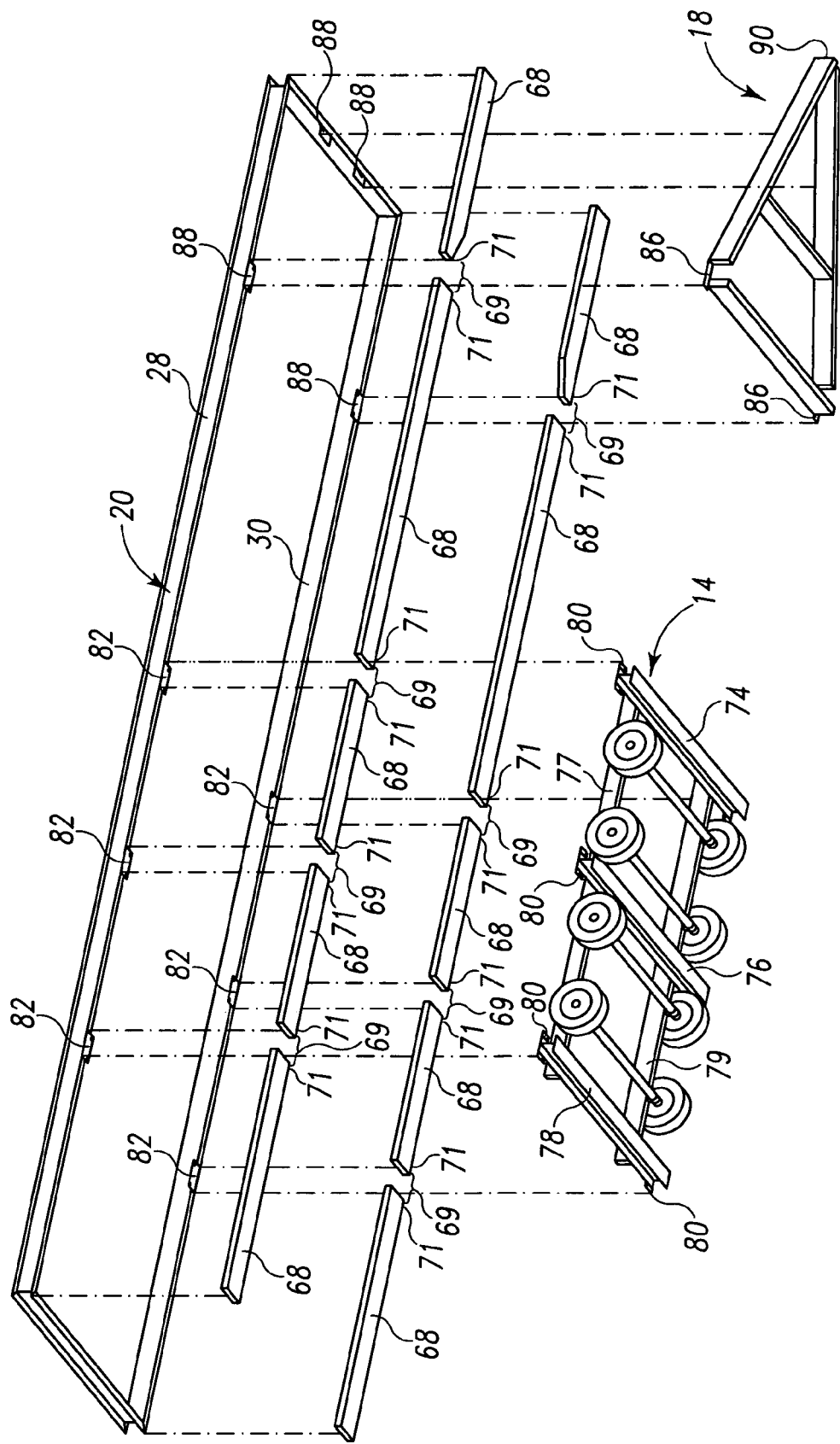
FIG. 9 is an exploded perspective view of the floor frame and transport structure shown in FIGS. 6, 7, and 8.

Floor frame 10 comprises a perimeter frame 20 defining the rectangular perimeter of the floor frame, as can be best viewed in FIGS. 6 and 9. Furthermore, floor frame 10 comprises a plurality of floor joists 22 spanning between sides 24, 26 of perimeter frame 20. Side frame member 28 is illustratively a C-shaped metal channel member having a ten inch cross-sectional height. Opposite side frame member 30 is also a C-shaped metal channel member having a ten inch cross-sectional height, arranged in parallel with side frame member 28, as can be seen in FIG. 1. Illustratively, floor joists 22 are boards having a 2"×8" cross-section, but other dimensions are within the scope of the disclosure.

Floor frame 10 is constructed in the following manner. Side frame member 28, as can be seen spanning the length of floor frame 10 in FIG. 1, is shown in a cut-away assembly view in FIG. 2. Side frame member 28 comprises a vertical wall 32, a top wall 34 extending from a top region of vertical wall 32, and a bottom wall 36 extending from a bottom region of vertical wall 32. Side frame member 28 is positioned such that top wall 34 and bottom wall 36 extend outwardly from vertical wall 32 with respect to floor frame 10. Accordingly, side frame member 28 is said to "open outwardly" relative to floor frame 10.

Figure 2:
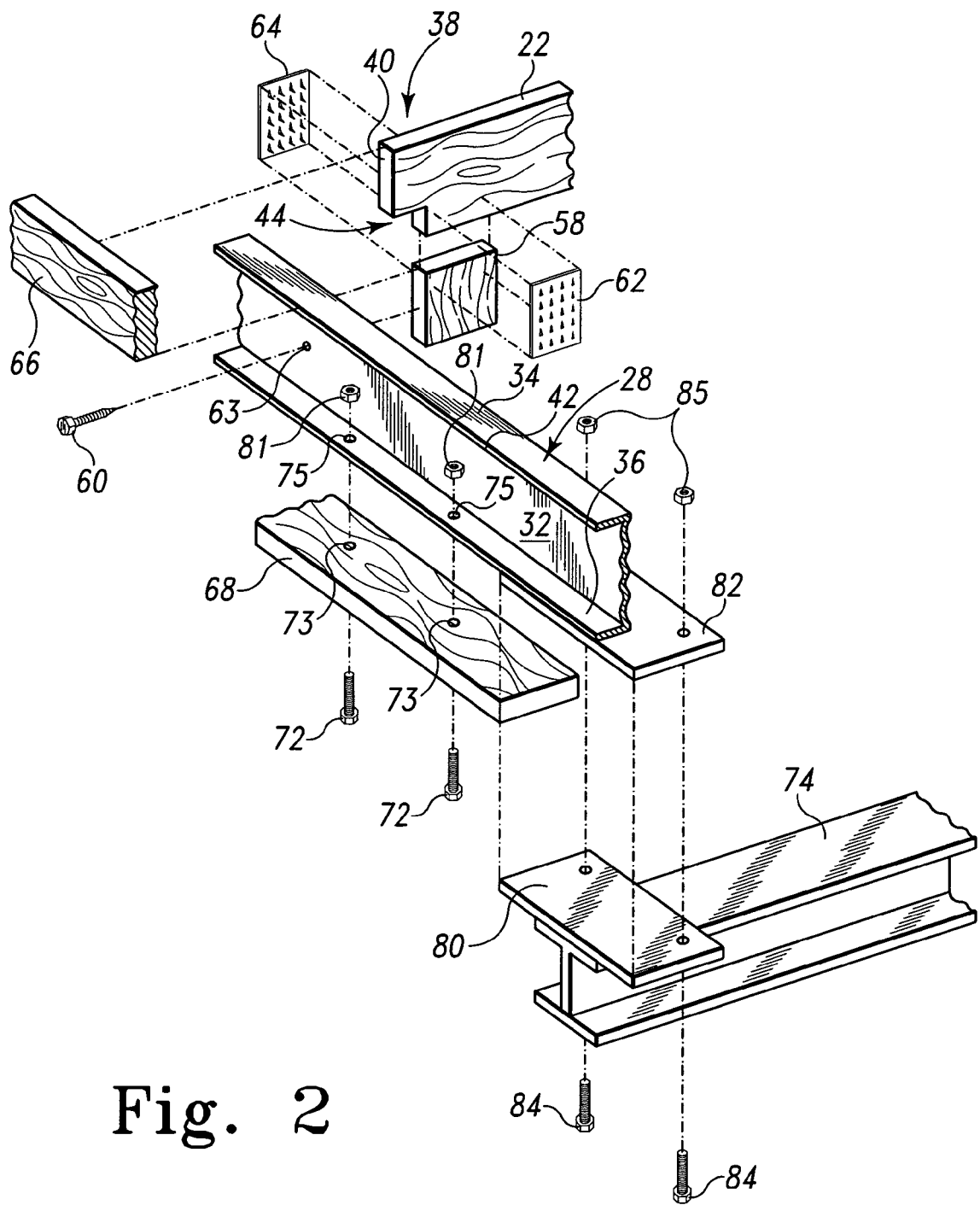
FIG. 2 is an exploded perspective view of a portion of the perimeter of the floor frame structure of FIG. 1.
Figure 4:
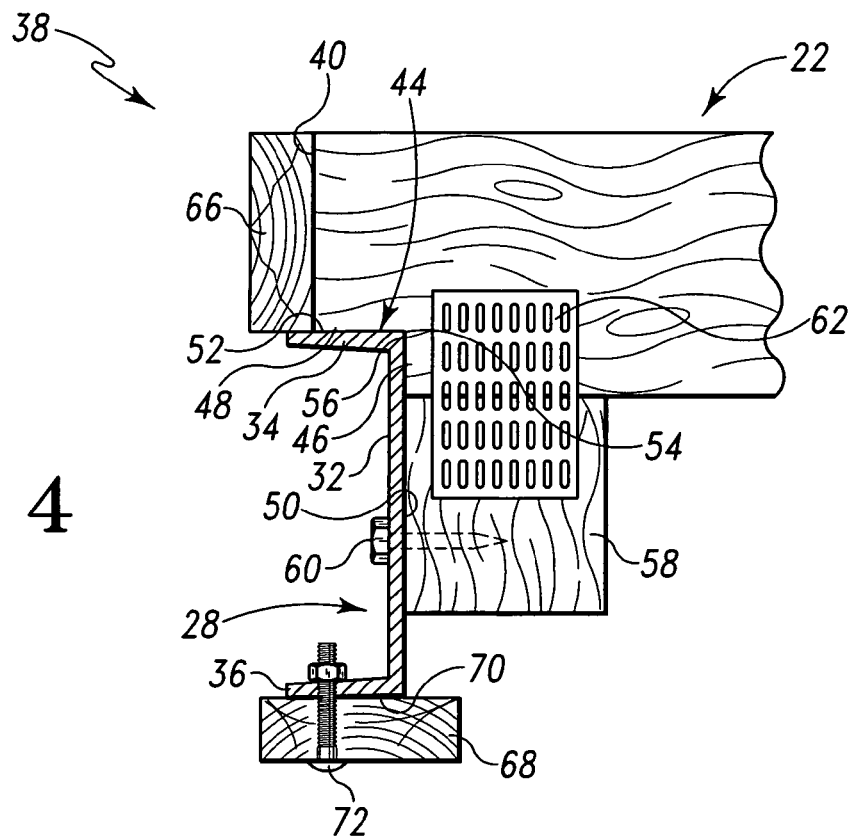
FIG. 4 is a sectional view of the assembled perimeter frame of FIG. 3, taken along the line 4—4.
Figure 5:
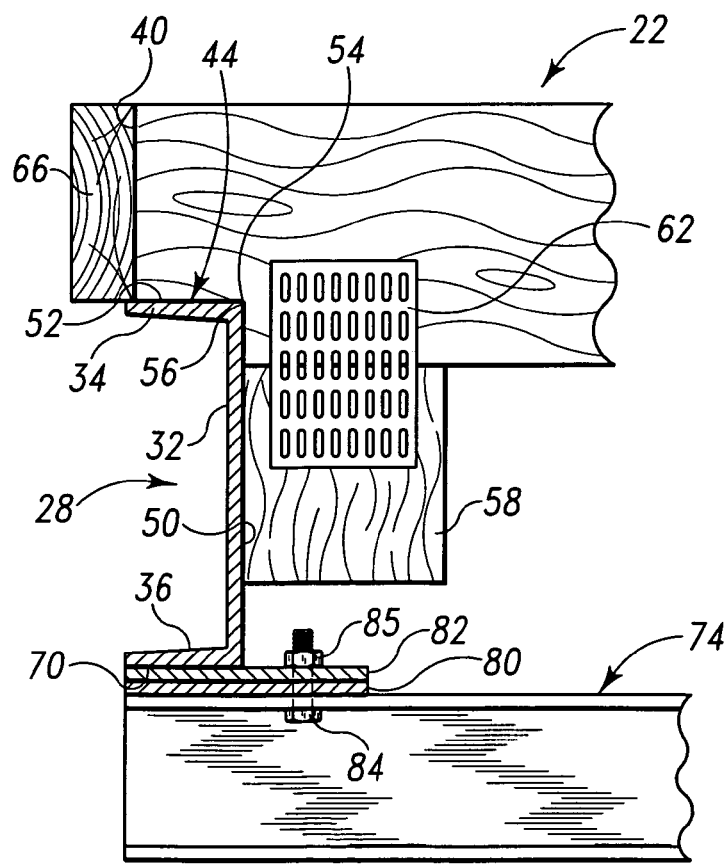
FIG. 5 is a sectional view, similar to FIG. 4, and taken along the line 5—5 of FIG. 3, showing a transport structure frame member coupled to the floor frame.

Floor joists 22, typically comprised of a wood material, are illustratively notched such that end 38 of floor joist 22 can rest upon top wall 34 of side frame member 28, and end surface 40 extends over a portion of surface 52 of top wall 34, as can be seen in FIGS. 2, 4, and 5. As viewed in FIGS. 4 and 5, notch 44 in end 38 of floor joist 22 is illustratively defined by a vertically extending surface 46 and a horizontally extending surface 48. When floor joist 22 is mounted on side frame member 28, vertically extending surface 46 engages an upper portion of surface 50 of vertical wall 32 and horizontally extending surface 48 engages a portion of surface 52 of top wall 34. Corner 54 of side frame member 28 is positioned in apex 56 of notch 44.

Illustratively, a brace 58 is positioned below joist 22 and adjacent to surface 50 of vertical wall 32 for lending additional support to joist 22. Brace 58 is illustratively a wood block (having an illustrative cross-sectional dimension of 2"×6"), but could alternatively comprise a bracket, a metal arm, or any other construction suitable for supporting joist 22 and transferring forces from joist 22 to side frame member 28. Brace 58 is illustratively mounted on frame member 28 with fastener 60 (illustratively a hex head screw) and is connected to floor joist 22 with gang nail bracket 62, as seen in FIG. 4. Frame member 28 is illustratively configured to have an aperture or hole 63 drilled therein (visible in FIG. 3) for receiving the fastener 60. A second gang nail bracket 64 can be used on an opposite side of brace 58 for additional support, as can be seen in FIG. 2. It should be understood, however, that other methods of attaching brace 58 to floor joist 22 are within the scope of the disclosure.

Base board 66 is fastened to end surface 40 of floor joist 22 in any manner known in the art, such as by using nails, screws, adhesive, etc. Base board 66 is illustratively a board having a 2"×6" cross-section, the board 66 being mounted such that at least a portion of base board 66 rests on horizontally extending surface 52 of top wall 34, as can be seen in FIGS. 4 and 5. It should be understood, however, that other board dimensions are within the scope of the disclosure.

Figure 3:
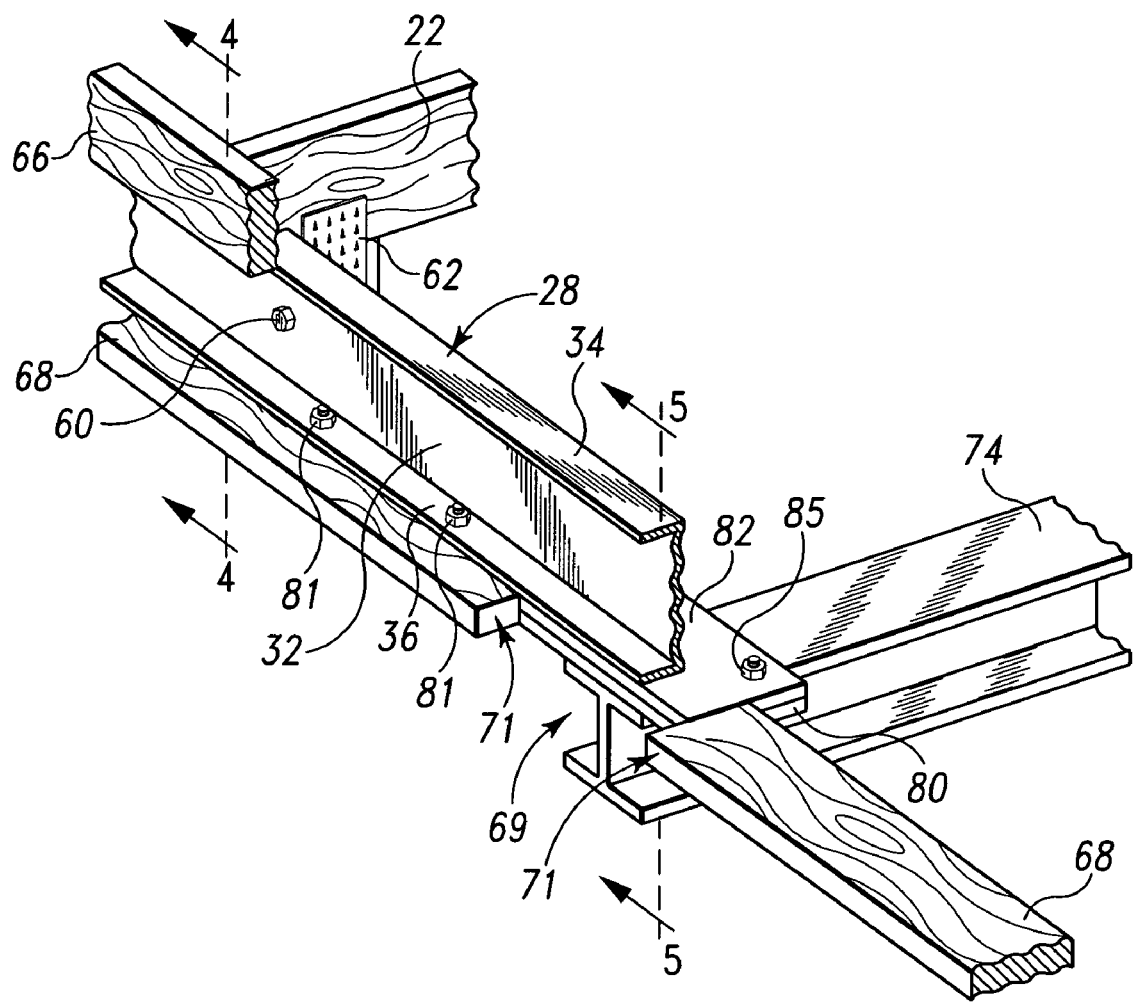
FIG. 3 is a perspective view of the portion of the perimeter frame shown in FIG. 2 when assembled.

Illustratively, a plurality of mud boards 68 is mounted on bottom surface 70 of side frame member 28. Mud boards 68 are illustratively boards having a 2"×6" cross-section, however, other board dimensions are within the scope of the disclosure. Mud boards 68 are mounted with fasteners, such as illustrative bolts 72, which extend through respective apertures 73 in board 68 and apertures 75 in bottom wall 36 of side frame members 28, 30 and which have nuts 81 threadedly attached thereto, as seen in FIGS. 2 and 4. However, other methods of mounting mud boards 68 to side frame member 28 are within the scope of the disclosure. Mud boards 68 are shown in FIG. 4 to be spaced apart such that transport structure 14 can be mounted directly to side frame members 28, 30 in the spaces or gaps 69 defined between confronting ends 71 of mud boards 68, as can be seen in FIGS. 3 and 9.

Transport structure 14 is removably mounted on perimeter frame 20 in the following manner. Transport structure 14 illustratively includes transverse I-beam frame members 74, 76, 78 and longitudinal frame members 77, 79, as can be seen in FIG. 9. Wheels 16 and their associated axles are coupled to longitudinal frame members 77, 79 for rotation. Coupled to the end of each transverse frame member 74, 76, 78 is a mounting flange 80, the mounting flanges 80 being configured to coincide with connection areas on perimeter frame 20. Specifically, mounting flanges 80 are configured to be in registry with receiving flanges 82 of perimeter frame 20, as can be seen in FIGS. 2 and 9. Illustratively, transverse frame members 74, 76, 78 extend beyond the width defined by wheels 16 such that when transport structure 14 is mounted, as can be seen in FIGS. 1, 6, 7, and 8, wheels 16 are situated within a "foot print" of perimeter frame 20.

Figure 8:
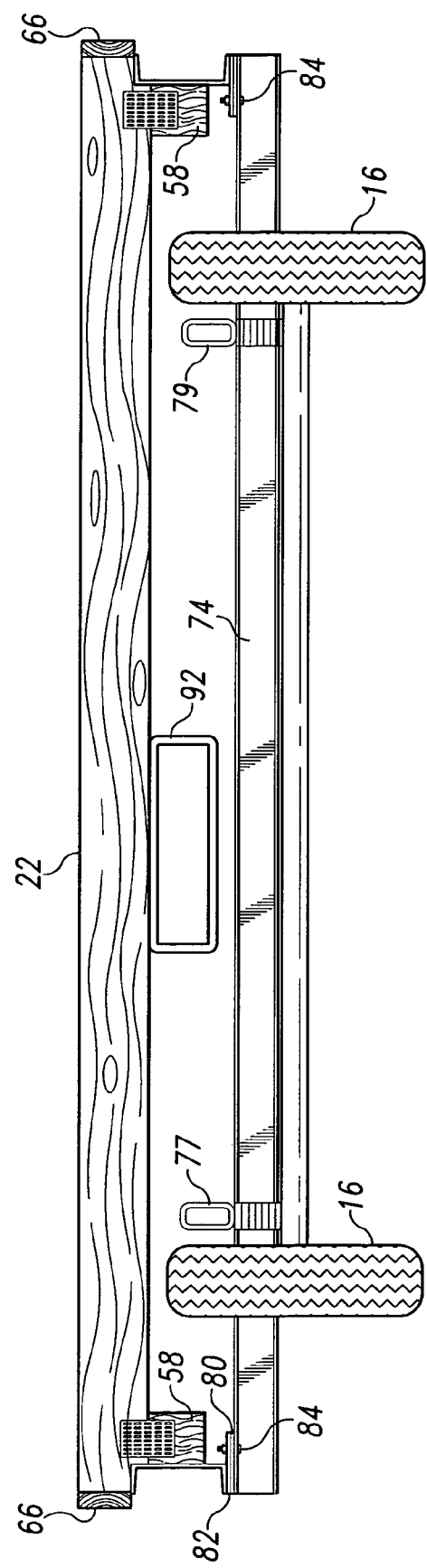
FIG. 8 is a sectional view taken along the line 8—8 of FIG. 6, showing the floor frame and the transport structure coupled thereto.

As can be seen in FIGS. 3, 5, 8, and 9, mounting flanges 80 and receiving flanges 82 are illustratively metal rectangular plates welded to transverse frame members 74, 76, 78 and perimeter frame 20, respectively. When transport structure 14 is mounted to perimeter frame 20, mounting flanges 80 are held in registry with receiving flanges 82 by bolts 84 and nuts 85, as can be seen in FIGS. 2 and 5. Furthermore, when the manufactured home 12 has reached its destination, transport structure 14 can be detached from its mounted position on perimeter frame 20 by removing bolts 84 and nuts 85. Illustratively, as can be seen in FIG. 8, other modular home components such as an HVAC duct 92 may be mounted to floor frame 10.

Other arrangements for coupling structure 14 to frame 20 constructions are within the scope of the disclosure. For example I-beams 74, 76, 78 may couple directly to bottom wall 36 of frame members 28, 30 by omitting flanges 80, 82 and by providing suitable fasteners such as bolts 84 which extend through apertures in a top wall portion of I-beams 74, 76, 78 and through apertures in wall 36 into threaded engagement with nuts 85.

Apexed member 18 is illustratively removable and is also constructed of metal beams. Apexed member 18 includes mounting flanges 86 similar to mounting flanges 80, described above. Likewise, receiving flanges 88 are welded to perimeter frame 20 and are configured to receive mounting flanges 86. Apexed member 18 is mounted to perimeter frame 20 and equipped such that manufactured home 12 can be towed by a vehicle from the apex 90 of apexed member 18, and removed from manufactured home 12 once the destination has been reached.

While the disclosure is susceptible to various modifications and alternative forms, specific exemplary embodiments thereof have been shown by way of example in the drawings and have herein been described in detail. It should be understood, however, that there is no intent to limit the disclosure to the particular forms disclosed, but on the contrary, the intention is to cover all modifications, equivalents, and alternatives falling within the spirit and scope of the disclosure as defined by the appended claims.

The invention claimed is:

1. A floor frame structure for a manufactured home, the floor frame structure comprising a perimeter frame having a pair of spaced apart side frame members and a pair of end frame members interconnecting the side frame members, each of the side frame members having a C-shaped cross section defined by a vertical wall, a top wall extending from a top region of the vertical wall, and a bottom wall extending from a bottom region of the vertical wall, a plurality of floor joists spanning between the side frame members, each floor joist having a pair of ends, each end being formed to include a notch, the notches receiving a portion of the top wall and a portion of the vertical wall of the associated side frame members and, a brace coupled to an end of one of the floor joists.

2. The floor frame structure of claim 1, wherein the brace is secured to the floor joist with a gang nail.

3. The floor frame structure of claim 1, wherein the vertical wall has an aperture formed therein and the brace is fastened to the vertical wall with a fastener configured to pass through the aperture in the vertical wall.

4. The floor frame structure of claim 1, further comprising a transport structure detachably mounted to the bottom wall of at least one of the side frame members, the transport structure having a plurality of wheels attached thereto.

5. The floor frame structure of claim 1, further comprising a tow structure detachably mounted to the bottom wall of at least one of the side frame members, the tow structure extending from one of the end frame members.

6. The floor frame structure of claim 1, further comprising a base board coupled to one of the ends of at least one of the floor joists.

7. The floor frame structure of claim 1, wherein the brace is fastened to the associated one of the wooden floor joists and fastened to an associated one of the side frame members to prevent movement of the joist in a vertical direction.

8. The floor frame structure of claim 7, wherein the brace is fastened to the associated one of the side frame members by a fastener that extends through a hole provided in the associated one of the side frame members.

9. The floor frame structure of claim 7, wherein the brace is fastened to the associated one of the floor joists by at least one gang nail.

10. The floor frame structure of claim 1, wherein the brace comprises a wooden block.

11. A transportable manufactured home module, the transportable manufactured home module comprising a floor frame having a metal perimeter frame with a plurality of transport-structure connection areas and a plurality of wooden boards coupled to an underside of the metal perimeter frame in aligned end-to-end relation, a plurality of gaps being defined between ends of the plurality of wooden boards, the plurality of connection areas being accessible through the plurality of gaps, and a transport structure detachably coupleable to the plurality of connection areas of the metal perimeter frame, wherein the transport structure comprises a transport frame and a set of wheels coupled to the transport frame.

12. The transportable manufactured home module of claim 11, wherein the connection areas of the metal perimeter frame comprises a set of first flanges and the transport frame has a set of second flanges that are detachably coupleable to the set of first flanges.

13. The transportable manufactured home module of claim 12, further comprising a set of bolts that detachably couple the sets of first and second flanges together.

14. The transportable manufactured home module of claim 11, wherein the transport frame includes two longitudinal frame members and a plurality of transverse frame members.

15. The transportable manufactured home module of claim 14, wherein the transverse frame members comprise I-beams.

16. The transportable manufactured home module of claim 11, further comprising a tow structure detachably mounted to the floor frame, the tow structure extending from one end of the floor frame.

17. A floor frame structure for a transportable manufactured home module, the floor frame structure having a perimeter, the frame structure comprising:

a plurality of spaced apart perimeter beams;

a first and second board mounted to a downwardly facing bottom surface of one of the perimeter beams, the first and second boards being aligned in end-to-end relation and spaced apart to define a gap therebetween;

a wheel support removably mounted to a portion of the downwardly facing bottom surface that is exposed in the gap of the selected one perimeter beam between the first and second boards, and wherein the wheel support comprises a transport frame and a set of wheels coupled to the transport frame.

18. The floor frame structure of claim 17, wherein the wheel support includes a set of flanges and the perimeter beams include connection areas for receiving the set of wheel support flanges.

19. The floor frame structure of claim 17, wherein the transport frame includes a plurality of longitudinal frame members and a plurality of transverse frame members.

* * * * *